United States Patent [19]

Schilling

[11] Patent Number: 5,030,798
[45] Date of Patent: Jul. 9, 1991

[54] LONGITUDINALLY DIVIDED CABLE SLEEVE HAVING A FLEXIBLE ENVELOPE

[75] Inventor: Werner Schilling, Wildenheid, Fed. Rep. of Germany

[73] Assignee: RXS Schrumpftechnik-Garnituren GmbH, Fed. Rep. of Germany

[21] Appl. No.: 446,793

[22] Filed: Dec. 6, 1989

[30] Foreign Application Priority Data

Dec. 16, 1988 [DE] Fed. Rep. of Germany ....... 3842520

[51] Int. Cl.⁵ .......................................... H02G 15/113
[52] U.S. Cl. .................... 174/92; 174/77 R; 174/88 R; 428/433; 428/461
[58] Field of Search ............... 174/92, 93, 88 R, 77 R; 428/432, 433, 461

[56] References Cited

U.S. PATENT DOCUMENTS

| | | | |
|---|---|---|---|
| 4,169,966 | 10/1979 | Casati | 174/92 |
| 4,203,000 | 5/1980 | Muller | 174/77 R X |
| 4,409,426 | 10/1983 | Nolf et al. | 174/77 R X |
| 4,446,173 | 5/1984 | Barrell et al. | 428/433 X |
| 4,590,328 | 5/1986 | Kunze | 174/77 R X |
| 4,684,554 | 8/1987 | Du-Yang | 428/461 X |
| 4,731,272 | 3/1988 | Meltsch | 174/92 X |
| 4,743,209 | 5/1988 | Gittle | 174/92 X |
| 4,792,472 | 12/1988 | Meltsch | 174/92 X |
| 4,812,355 | 3/1989 | Yokoyama et al. | 428/432 X |
| 4,880,676 | 11/1989 | Puigcerver et al. | 174/92 X |
| 4,902,569 | 2/1990 | Chen | 428/461 X |

FOREIGN PATENT DOCUMENTS

| | | |
|---|---|---|
| 2911297 | 9/1971 | Fed. Rep. of Germany . |
| 1154742 | 5/1985 | U.S.S.R. .................... 428/433 |

Primary Examiner—Morris H. Nimmo
Attorney, Agent, or Firm—Hill, Van Santen, Steadman & Simpson

[57] ABSTRACT

A longitudinally divided cable sleeve is composed of a flexible foil envelope having longitudinal closure elements along each longitudinal edge and has structural elements or support members for supporting the envelope as it is wrapped around a cable splice or region. Preferably, the flexible foil is composed of a plurality of layers including a plastic layer, a reinforcing layer and at least metal foil layer, which all adhere to one another by adhering layers.

29 Claims, 2 Drawing Sheets

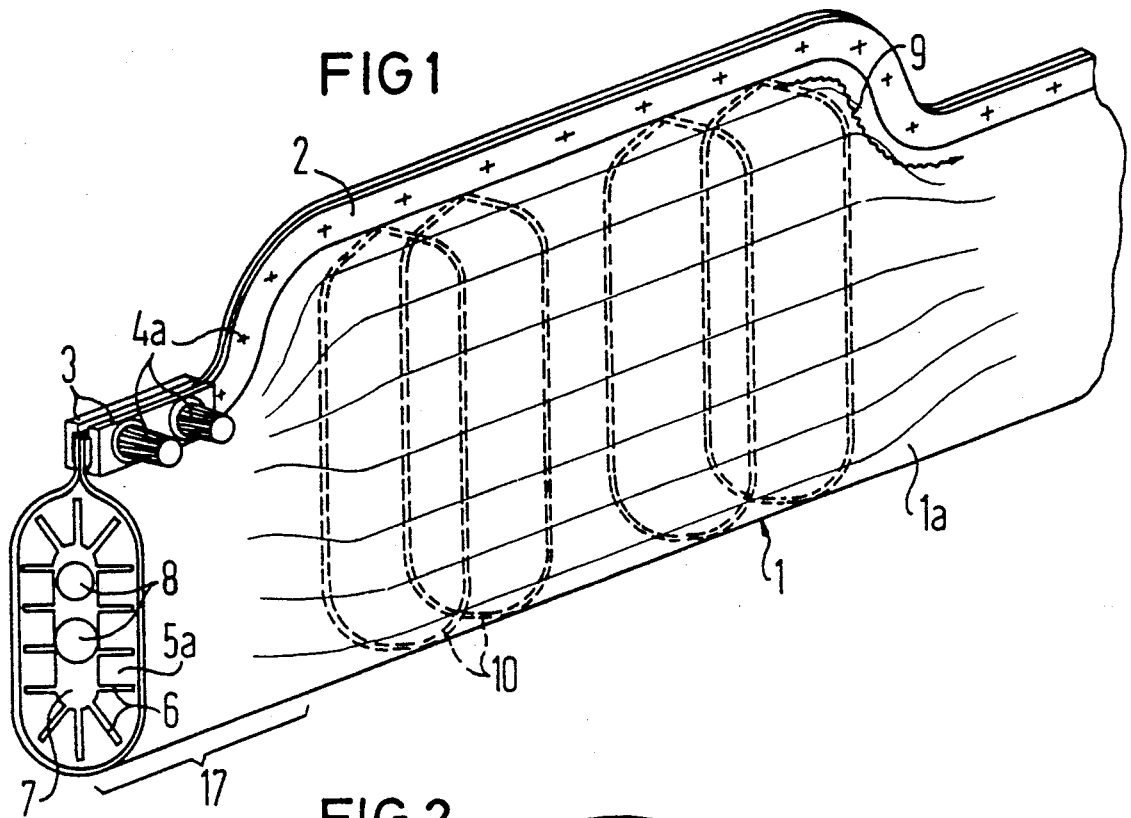
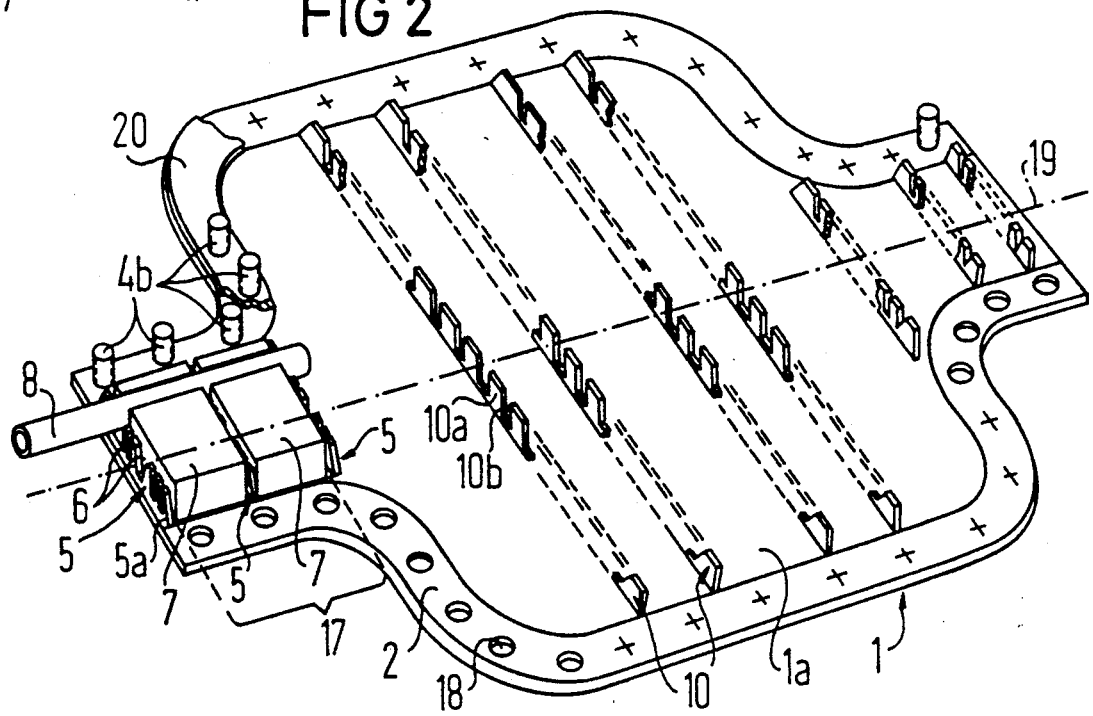

LONGITUDINALLY DIVIDED CABLE SLEEVE HAVING A FLEXIBLE ENVELOPE

BACKGROUND OF THE INVENTION

The present invention is directed to a longitudinally divided cable sleeve composed of an envelope having a longitudinal closure and end sealing regions. The invention is also directed to the enveloping material prior to being formed into the cable sleeve.

Numerous embodiments of cable sleeves are known and examples are cable sleeves of a plastic material having reinforcing inserts, which sleeves are usually rigid. German Published Application 2 011 297 discloses a cable sleeve which has two rigid half-shells of plastic material which half-shells have both reinforcing inserts as well as metal inserts. Due to the rigid design of the two half-shells, this cable sleeve has two longitudinal slots and, thus, two longitudinal seals are required. As already mentioned, the execution of the half-shells provides a rather stable arrangement and they are relatively heavy and provide a certain unpleasantness during the assembly, due to their rigidity. These half-shells, in addition, are reinforced with glass fibers which provides additional reinforcements and also increases the thickness of the parts due to the glass fibers being embedded in the hard resin and, thus, increases the stiffness of the shells. In addition, a metal layer is provided in the shells, however, it serves only as a permeation barrier.

SUMMARY OF THE INVENTION

The object of the present invention is to design a flexible envelope for a cable sleeve, wherein the weight is reduced but provides a good mechanical strength, and wherein the flexibility should be simultaneously achieved and contributes to the facilitation of the assembly of the cable sleeve so that it may be universally employable. These objects are achieved by an improvement in a longitudinally divided cable sleeve comprising an envelope having a longitudinal closure and end face sealing regions. The improvements are that the cable includes supporting members, at least in sub-regions, and that the envelope is constructed as a flexible foil and is applied onto the supporting members. The flexible foil forming the envelope is composed of multiple layers which adhere to one another and includes a plastic layer, a reinforcing layer and at least one metal foil layer.

The object is also to create a flexible foil for use as the envelope, which flexible foil can be cut or formed into the envelope of any desired configuration.

In previous, conventionally constructed cable sleeves, the two functions of "supporting-carrying" and "protective envelope" were united in a rigid sleeve member. This leads to the above-mentioned disadvantages. In the cable sleeve of the present invention, these functions are separate, because a flexible envelope of various material layers is shaped over a mechanically stiff skeleton or, respectively, over one or more supporting members and the envelope is shaped to form the cable sleeve with the corresponding closure elements.

The flexible envelope is made from an intermediate multi-ply or multi-layer sheet of material which is preferably composed of a plurality of layers or plies which include a layer of plastic, for example a polyethylene, a layer of a metal foil, composed, preferably, of steel foil, which is surrounded with a corrosion-resistant plastic coating of a copolymer on all sides. Moreover, this multi-layer material will include a reinforcing layer which may be formed of individual elements, such as glass fibers which are worked in longitudinally proceeding, in a cross-lattice form or as a weave. This multi-ply material will have a high resistance to stretching and penetration and, thus, the structure utilizing this material as an envelope which shall be set forth in greater detail will have excellent flexibility.

By utilizing this intermediate multi-ply material, the shape of the envelope can take various versatile forms. Thus, for example, a flexible multi-ply stock material in the form of the foil is drawn over a mechanically rigid skeleton or support structure and is then closed with suitable fastening mechanisms. The stiffening skeleton or, respectively, support members are expediently manufactured of a plastic in an extrusion process, wherein the profiles are then cut to the required width for the corresponding utilization. The above-described half-finished goods are then fabricated with the corresponding support members to form the sleeve.

Differing from conventional, mechanically rigid sleeves, wherein a specialized tool is required, practically per type of product family, the new sleeves are fabricated with a great variability from nearly the same initial components. The flexible foil itself is pressed or, respectively, laminated from the above-mentioned layers or, respectively, foils to form half of the intermediate multi-ply stock and then is cut to length in a manner similar to yard goods for the particular cable sleeve. The envelope, however, can also be manufactured as formatted goods wherein it is then advantageous that all edges of the metal foil are protected against corrosion. Overall, the fabricated intermediate blank has a thickness of only about 1 mm so that the high flexibility and low weight are guaranteed.

Other advantages and features of the invention will be readily apparent from the following description of the preferred embodiments, the drawings and claims.

BRIEF DESCRIPTION OF THE DRAWINGS

FIG. 1 is a perspective view showing an assembled cable sleeve in accordance with the present invention;

FIG. 2 perspective view showing the envelope and the supporting members in a flat, planar arrangement;

DESCRIPTION OF THE PREFERRED EMBODIMENTS

Figure 3:
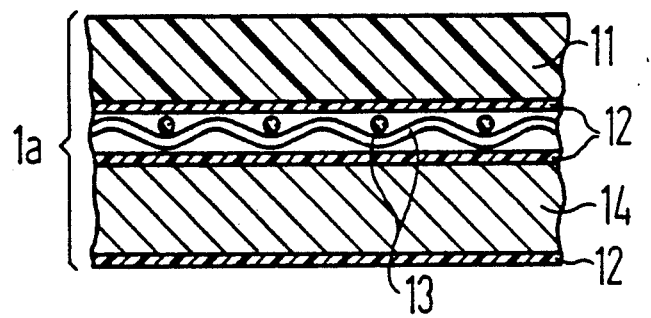
FIG. 3 is a partial, enlarged cross sectional view of one embodiment of the multi-ply material for the envelopes.
Figure 4:
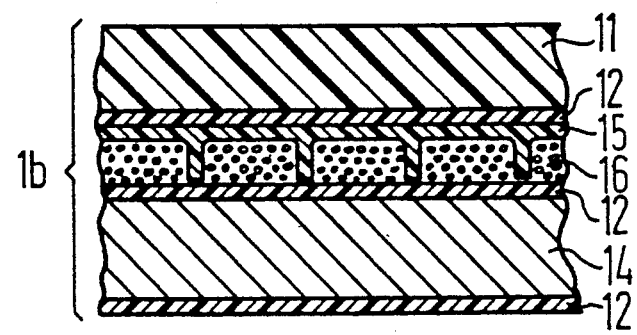
FIG. 4 is a partial, enlarged cross sectional view of a second embodiment for the multi-ply material for the envelopes.

The principles of the present invention are particularly useful when incorporated in a cable sleeve, generally indicated at 1 in FIG. 1. As illustrated in FIG. 1, the cable sleeve 1 is completely assembled and illustrates the various individual sub-regions of the sleeve. The cable sleeve I includes an envelope 1a which is placed around the cable splice and, if necessary, is drawn onto inserted structural members 10 that, for example, are fashioned as supporting ledges, ribs or battens and the envelope 1a is closed along a longitudinal edge 2 by closure elements, which include nuts 4a. In this exemplary embodiment, the closure elements on one longitudinal edge are fashioned as threaded members, such as bolts 4b (FIG. 2), which are preferably formed of a plastic, such as polyethylene, and the second longitudinal edge has a plurality of corresponding holes or openings 18. After the joining, which includes inserting the bolts 4b through the opening 18, the longitudinal regions are then clamped together with appropriate nuts, such as 4a, which are threaded on the bolts. Dependent on the requirements, pressure pads in the form of profiled webs 3 of polyethylene can be inserted in the closure region to obtain a uniform pressure distribution whereby this measure is especially advantageous in the front end introduction zone or region 17 of the cable sleeve, as illustrated in FIG. 1.

At each of the end regions, such as the end region 17, the foil 1a is provided with receptacle-like sealing chambers formed by members 5 which project inwardly from the inward surface of the foil. A sealing compound 7, which may be a bituminous material, is inserted into this receptacle-like sealing chamber and will sealingly surround a cable 8 which is extending into the cable sleeve. As illustrated in both FIGS. 1 and 2, each of the members 5, which may be a ledge, a batten or strip like ridge, are sub-divided by a plurality of shaped cut-outs 6 into individual segments 5a. The arrangement of the cut-outs 6 and their shape will determine the structure of the segments and create, as illustrated in FIG. 1, an oval-shaped supporting member. If a circular supporting member is desired, then the cut-outs 6 will each have a pie-shaped configuration. Thus, dependent on the shape of these segments 5a and the cut-outs 6 laying therebetween, various ultimate shapes can be obtained. Moreover, the envelope 1a conforms to the splice-shaped line therebelow as the contour lines, such as 9 (FIG. 1) intend to express. It is also indicated that the plurality of support members 10 are annularly arranged in the interior of the cable sleeve and support the envelope in this fashion.

The cable sleeve 1 in an opened condition is illustrated in FIG. 2. The introduction region 17, as illustrated, is composed in this case of two receptacles for the sealing of the material 7 that lies following one another in an axial direction, such as indicated by the chain line showing the axis 19. These receptacles are laterally limited by the supporting members 5 and, as illustrated, three such axially spaced members are provided, which proceed transversely and symmetrically relative to the axis 19. The supporting members 5 can be formed of the ledge-shaped or strip-shaped profiles which are provided with cut-outs 6 so that the supporting members 5 are actually now only composed of segments 5a, whereby the shaping is defined by the various shapes of the cut-outs. These cut-outs 6 ultimately determine the shape of the introduction region when joining, as already set forth above. It may also be seen that the inserts of the sealing material 7 is thicker than the height of the lateral supporting members 5 or, respectively, the segments 5a, so that an adequate sealing material 7 is present for a tight covering of the cable 8. The required sealing occurs when joining the envelopes 1a due to the pressure generated when closing with the closure elements, such as 4a and 4b. It is also indicated that the closure regions 2 can be occupied with a sealing band 20 along a longitudinal edge in order to increase the sealing effect.

The supporting members 10 are, again, illustrated as being arranged in the middle region of the cable sleeve 1 and, as illustrated, include cuts or incisions 10b which sub-divide each of the regions into segments 10a. As illustrated, this embodiment promotes the flexibility of the cable sleeve and makes it possible for the envelope 1a to be fashioned as a read-made component part for a cable sleeve. The supporting members 10 can be firmly joined to the envelope 1a over the entire width or only in sub-regions so that a far-reaching adaptation can also be carried out here. In principle, however, separate supporting members can also be employed that are then expediently secured to the article to be enveloped, such as, for example, a cable splice. By way of addition, let it be pointed out that the fashioning of the cut-outs of the supporting members 5 in the introduction regions, as well as the actual supporting members 10 in the interior regions of the cable sleeve are merely suggested and can be shaped, dependent on the desired outside shape of the cable sleeve. For example, a circular outside shape will occur in the introduction regions of the cable sleeve when all cut-outs 6 have the same triangular shape over the entire length of each of the supporting members 5.

Some examples of inventive structures of flexible foil employed as a half-finished or intermediate good for the envelope is set forth with reference to the following FIGS. 3-6, wherein the succession and plurality of the individual foil layers can be varied in an arbitrary fashion without changing the fundamental principle.

The foil 1a (see FIG. 3) is composed of a cover layer 11 of polyethylene, an adhesion layer 12, a reinforcing layer 13, a second adhesion layer 12 separating the reinforcing layer 13 from a metal foil layer 14, whose inner surface is covered by a third adhesion layer 12. Each of the adhesion layers 12 is composed of a copolymer and the reinforcing layer 13 of the envelope material 1a is composed of glass fibers, preferably arranged in the cross-form or woven form. Based on the required properties, the following values are especially suitable for the respective thicknesses of the individual layers. The cover layer 11 is preferably of a polyethylene and has a thickness of $\leq 200$ $\mu$m and preferably 150 $\mu$m; each of the adhesion layers 12 is a copolymer preferably of a polyethylene acrylic acid ester having a thickness of $\leq 50$ $\mu$m and preferably $\leq 30$ $\mu$m; the reinforcing layer 13 is preferably composed of glass fibers and has a thickness of $\leq 150$ $\mu$m and preferably 120 $\mu$m; the metal foil layer 14 is preferably a steel foil having a thickness of $\leq 200$ $\mu$m and preferably 150 $\mu$m. It should be noted that each of the above-mentioned values is also for the layers of the other following embodiments.

A second embodiment of a flexible foil 1b is substantially similar to the embodiment 1a except that the reinforcing layer 13 of the embodiment 1a is replaced by a reinforcing layer, which has a hollow profile 15 having a thickness of approximately 300 $\mu$m. Individual cavities of this profile 15 are filled with a sealing material, preferably a bituminous sealing compound. This embodiment has the advantages that a certain "self-healing" will occur given a puncture or a cut of the foil 1b which is utilized as an envelope since the sealing material will fill out and close off the injury or cut portion in a sealing fashion. The remainder of the layers, such as 12, 14 and 11, are the same as in the above first embodiment 1a of FIG. 3.

Figure 5:
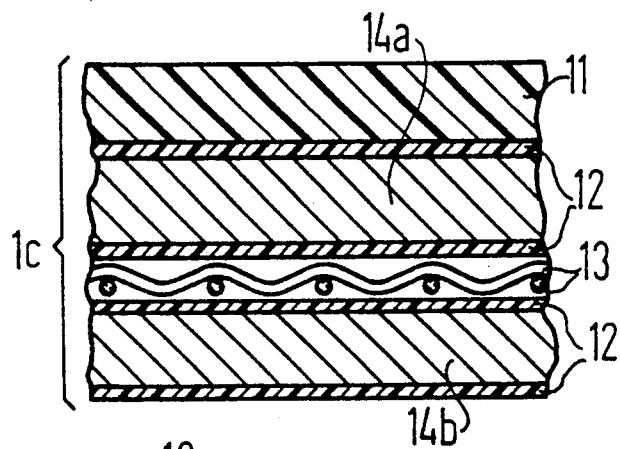
FIG. 5 is a partial, enlarged cross sectional view of a third embodiment of a multi-ply material for the envelope.

A third embodiment of the foil is illustrated by the embodiment 1c of FIG. 5. In this embodiment, an additional metal foil 14a, which is preferably a steel foil, which is coated with the copolymer layers 12, is introduced between the reinforcing layers 13 and the cover foil 11. A second or original foil 14b is in the position of the foil 14 on the inside of the woven reinforcing layer 13. The mechanical strength is, thus, increased by these two metal foils 14a and 14b, which extend on opposite sides of the reinforcing layer 13.

Figure 6:
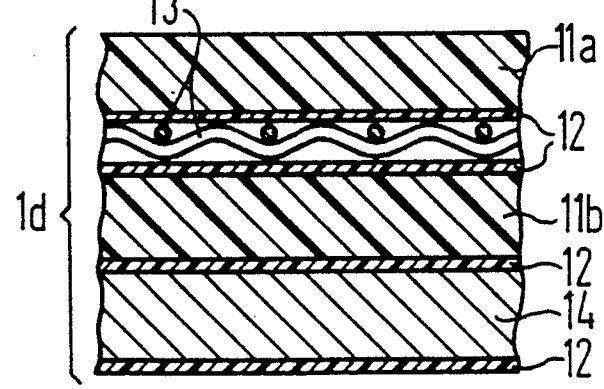
FIG. 6 is a partial, enlarged cross sectional view of a fourth embodiment of the layer structure for the multi-ply material used for the envelope in the present invention.

In a fourth embodiment illustrated by the foil 1d of FIG. 6, an outer cover foil 11a is separated by the adhesion layer 12 from the reinforcing layer 13. In this embodiment, a second plastic layer 11b, preferably a polyethylene layer, is additionally inserted between the reinforcing layer 13 and the metal foil layer 14. It should be noted that each layer is separated from an adjacent layer by one of the adhesion layers and that the metal foil layer 14 is covered on the inner surface by another copolymer adhesion layer 12.

The sequence of the individual layers, as well as the materials of the individual layers, can be modified to meet various requirements. The flexible foils described in FIGS. 3-6 can be manufactured in a simple and indefinitely standard procedure as intermediate goods for cable sleeves and are then shaped by appropriate fabrication into the cable sleeves in a fashion already set forth hereinabove. For example, the sleeve can be cut from a sheet of this material and provided with the closure elements 4b and 4a along opposite edges.

Although various minor modifications may be suggested by those versed in the art, it should be understood that I wish to embody within the scope of the patent granted hereon all such modifications as reasonably and properly come within the scope of my contribution to the art.

I claim:

1. In a longitudinally divided cable sleeve having an envelope having a longitudinal closure and end face sealing regions, the improvements comprising the cable sleeve being formed by a plurality of supporting members with at least two supporting members being arranged to extend transversely relative to an introduction direction in a region at each end face sealing region to form a receptacle for a plastic sealing material and some supporting members being arranged in a region between said receptacles, said plastic sealing material being thicker than the height of the supporting members of the receptacles, the supporting members being fashioned as shaped strips having cut-outs that are shaped so that the members of each region can be bent into a tubular shape, said strips being placed on an inwardly directed side of the envelope and being fixed to the envelope, region-by-region, said envelope being fashioned as a flexible envelope composed of multiple layers including a plastic layer, a reinforcing layer, and a metal foil layer with adhesion layers interposed therebetween, said envelope being wrapped around said supporting members to form the cable sleeve.

2. In a longitudinally divided cable sleeve according to claim 1, wherein the envelope is composed of planar-shaped parts being fashioned symmetrically relative to a longitudinal axis of the cable sleeve.

3. In a longitudinally divided cable sleeve according to claim 1, wherein the envelope is cut out of a planar foil fabricated as yard goods and with said cut-out being symmetrical relative to a longitudinal axis.

4. In a longitudinally divided cable sleeve according to claim 1, wherein the plastic sealing material is a bituminous sealing compound.

5. In a longitudinally divided cable sleeve according to claim 1, which includes closure elements arranged along each of the longitudinal edges of the envelope.

6. In a longitudinally divided cable sleeve according to claim 5, wherein the closure elements are arranged along one of the longitudinal edges are threaded members and the closure elements along the second longitudinal edges are holes for receiving said threaded members and nuts are provided for clamping the edge with the holes onto said threaded members.

7. In a longitudinally divided cable sleeve according to claim 6, wherein the threaded members and nuts are of a polyethylene plastic material.

8. In a longitudinally divided cable sleeve according to claim 6, wherein a sealing strip is introduced between the first and second longitudinal edges to be clamped therebetween.

9. In a longitudinally divided cable sleeve according to claim 6, which includes supporting webs composed of plastic being arranged outside of the longitudinally proceeding sealing ranges and being engaged by said closure elements to clamp the edges therebetween.

10. In a longitudinally divided cable sleeve according to claim 1, wherein the supporting members in the interior region of the cable sleeve are constructed as independent annular component parts of a plastic.

11. In a longitudinally divided cable sleeve according to claim 1, wherein the supporting members are manufactured of plastic profiles of a polyethylene material.

12. In a longitudinally divided cable sleeve according to claim 11, wherein the supporting members are joined to the envelope region-by-region.

13. In a longitudinally divided cable sleeve according to claim 11, wherein the supporting members are joined to the envelope over the entire length.

14. In a longitudinally divided cable sleeve according to claim 1, wherein said envelope is a multi-ply foil having a plurality of layers including a cover layer of a plastic material, a reinforcing layer, a metal foil layer coated on both sides with a copolymer adhesion layer and an adhesion layer between any of said cover and reinforcing layers.

15. In a longitudinally divided cable sleeve according to claim 14, wherein said foil includes a second metal foil layer, said layers being arranged from outside inward as a cover layer, a first metal foil layer, the reinforcing layer, and a second metal foil layer.

16. In a longitudinally divided cable sleeve according to claim 14, which includes a second plastic layer, said layers being arranged from outside toward the inside in the order of the cover layer, an adhesion layer, a reinforcing layer, a second adhesion layer, the second plastic layer and the metal foil layer.

17. In a longitudinally divided cable sleeve according to claim 14, wherein the cover layer is preferably of a polyethylene material, each of the adhesive layers is preferably composed of a polyethylene acrylic acid ester, the reinforcing layer is composed of glass fibers and the metal foil layer is composed of a steel foil.

18. In a longitudinally divided cable sleeve according to claim 14, wherein the reinforcing layer comprises a plastic foil of a polyethylene material having a plurality of cavities, said cavities being filled with a plastic sealing compound.

19. In a longitudinally divided cable sleeve according to claim 18, wherein the covered layer has a thickness of ≦200 μm, each of the adhesion layers has a thickness of ≦50 μm, said metal foil layer has a thickness of ≦200 μm, said reinforcing layer has a thickness of approximately 300 μm.

20. In a longitudinally divided cable sleeve according to claim 1, which includes a second metal foil layer being coated on both sides with a copolymer, said material having the layers from the outside to the inside being a cover layer, a first metal foil coated on both sides with the copolymer, a reinforcing layer, and the second metal foil layer having each side coated with the copolymer.

21. In a longitudinally divided cable sleeve according to claim 1, which includes a second plastic layer composed of polyethylene, said foil having the layers from the outside toward the inside comprising the cover layer separated by an adhesion layer from a reinforcing layer, an adhesion layer separating the reinforcing layer from the second plastic layer, and the innermost layer being a metal foil layer.

22. In a longitudinally divided cable sleeve according to claim 1, wherein the reinforcing layer comprises longitudinally preceeding reinforcing elements composed of glass fibers.

23. In a longitudinally divided cable sleeve according to claim 1, wherein the reinforcing layer is composed of longitudinally transversely extending reinforcing elements arranged in a lattice-form, said elements being glass fibers.

24. In a longitudinally divided cable sleeve according to claim 1, wherein the reinforcing layer is composed of a weave of glass fibers.

25. In a longitudinally divided cable sleeve according to claim 1, wherein the individual layers of the foil are at the cover layer of a plastic having a thickness of ≦200 μm, each of the adhesion layers being of a thickness of ≦50 μm, said metal foil layer being of a thickness of ≦200 μm, said reinforcing layer being of a thickness of ≦150 μm.

26. In a longitudinally divided cable sleeve according to claim 25, wherein the metal foil layer and the cover layer have a thickness of 150 μm, the reinforcing layer has a thickness of 120 μm, and each of the adhesion layers has a thickness of 30 μm.

27. An intermediate foil material for producing a foil for use in a cable sleeve having a flexible foil as the envelope, said foil being composed of a plurality of layers including a cover layer of a polymeric material, a reinforcing layer, a metal foil layer being provided on each surface with a copolymer adhesion layer and a copolymer adhesion layer between the cover layer and the reinforcing layer, the reinforcing layer including a planar profile with cavities, said cavities being filled with a plastic sealing compound.

28. An intermediate foil material according to claim 27, wherein the covered layer has a thickness of ≦200 μm, each of the adhesion layers has a thickness of ≦50 μm, said metal foil layer has a thickness of ≦200 μm, said reinforcing layer has a thickness of approximately 300 μm.

29. In a longitudinally divided cable sleeve having an envelope having a longitudinal closure and end face sealing regions, the improvements comprising the cable sleeve being formed by a plurality of supporting members at least in sub-regions, said envelope being fashioned as a flexible envelope composed of multi-ply foil including a plastic layer, a reinforcing layer, and a metal foil layer with adhesion layers interposed therebetween, the reinforcing layer comprising a plastic foil of a polyethylene material having a plurality of cavities with the cavities being filled with a plastic sealing compound, said envelope being wrapped around said supporting members to form the cable sleeve.

* * * * *